United States Patent [19]

Slepetys et al.

[11] Patent Number: 5,393,340
[45] Date of Patent: Feb. 28, 1995

[54] METAKAOLIN PIGMENT WITH HIGH BRIGHTNESS AND LOW ABRASION AND MANUFACTURE THEREOF FROM SOFT KAOLIN CLAYS

[75] Inventors: Richard A. Slepetys, Brick; M. Phillip Jameson, Somerville, both of N.J.

[73] Assignee: Engelhard Corporation, Iselin, N.J.

[21] Appl. No.: 150,335

[22] Filed: Nov. 9, 1993

Related U.S. Application Data

[63] Continuation of Ser. No. 935,611, Aug. 26, 1992, abandoned.

[51] Int. Cl.$^6$ ............................................. C04B 14/10
[52] U.S. Cl. ...................................... 106/484; 106/416; 106/486; 501/141; 241/24
[58] Field of Search ................ 501/141; 106/400, 416, 106/484, 486; 241/24

[56] References Cited

U.S. PATENT DOCUMENTS

| | | | |
|---|---|---|---|
| 2,536,647 | 12/1950 | Millman et al. | 106/416 |
| 2,990,958 | 7/1961 | Greene et al. | 209/166 |
| 2,992,936 | 7/1961 | Rowland | 106/486 |
| 3,014,836 | 12/1961 | Proctor, Jr. | 106/416 |
| 3,058,671 | 10/1962 | Billue | 106/416 |
| 3,171,718 | 3/1965 | Gunn et al. | 106/416 |
| 3,343,973 | 9/1967 | Billue | 106/416 |
| 3,519,453 | 7/1970 | Morris et al. | 106/288 |
| 3,586,523 | 6/1971 | Fanselow et al. | 106/416 |
| 3,659,708 | 5/1972 | Morris et al. | 209/5 |
| 3,743,190 | 7/1973 | Whitley | 241/4 |
| 3,924,813 | 12/1975 | Chapman | 214/4 |
| 4,076,548 | 2/1978 | Bundy et al. | 106/416 |
| 4,381,948 | 5/1983 | McConnell et al. | 106/416 |
| 4,492,628 | 1/1985 | Young et al. | 209/5 |
| 4,738,726 | 4/1988 | Pratt et al. | 501/148 |
| 5,011,534 | 4/1991 | Berube et al. | 106/416 |

FOREIGN PATENT DOCUMENTS

| | | |
|---|---|---|
| 1579130 | 8/1969 | France. |
| 894333 | 4/1962 | United Kingdom. |
| 1181491 | 2/1970 | United Kingdom. |

OTHER PUBLICATIONS

Effect of chemical treatment on crystal structure and thermal behavior of Kaolinite, Kristof et al., Clay Materials Society, vol. No. 5; 608–612, 1992, no month.

Reed, "Principles of ceramic processing"; Wiley & Sons, Inc., 1988, p. 261, no month.

Primary Examiner—Mark L. Bell
Assistant Examiner—Michael Marcheschi
Attorney, Agent, or Firm—Inez L. Moselle

[57] ABSTRACT

The invention relates to novel metakaolin pigments which are characterized by a unique combination of exceptionally high brightness and exceptionally low abrasion along with the excellent hiding power equal to that achieved by premium conventional calcined kaolin pigments. The invention relates also to a method of producing such metakaolin pigments by subjecting relatively coarse high purity and high crystallinity kaolin booklets to highly intensive media grinding to generate fine kaolin particles of reduced crystallinity, and calcining the ground particles while limiting calcination temperature and time such as to form metakaolin.

4 Claims, 2 Drawing Sheets

METAKAOLIN PIGMENT WITH HIGH BRIGHTNESS AND LOW ABRASION AND MANUFACTURE THEREOF FROM SOFT KAOLIN CLAYS

This is a continuation of application Ser. No. 07/935,611, filed Aug. 26, 1992, now abandoned.

This invention relates to novel metakaolin pigments characterized by a unique combination of exceptionally high brightness and exceptionally low abrasion along with the excellent hiding power equal to that achieved by premium conventional calcined kaolin pigments, which do not possess the unique combination of brightness and low abrasion. The invention relates also to a method of producing such pigments by subjecting relatively coarse high purity and high crystallinity kaolin booklets to highly intensive media grinding to destroy or reduce crystallinity and calcining the ground particles while limiting calcination temperature and time such as to form metakaolin.

BACKGROUND OF THE INVENTION

It is well known in the art that when kaolin clay is calcined, it undergoes a series of characteristic changes, detectable by differential thermal analysis (DTA). At about 840°–1200° F. (450°–650° C.), the clay undergoes a strongly endothermic dehydration reaction resulting in the conversion to material known as metakaolin. The metakaolin state is conveniently ascertained by acid solubility testing because the alumina in the clay is virtually completely soluble in strong mineral acid. Typically, about 45% by weight of metakaolin is soluble in hydrochloric acid of 18% strength. In contrast, solubility in hydrochloric acid of the alumina component in hydrated kaolin is very limited. Furthermore, when kaolin is calcined beyond the endotherm at higher temperatures it undergoes a characteristic exothermic reaction, resulting in phase transformation manifested by markedly reduced alumina solubility.

Calcined kaolin pigments have been used for several decades in a number of industrial applications such as paper coating, paper filling, paints, plastics, etc. In these applications they impart to the finished products a number of desirable properties: brightness, opacity, hiding power, strength (in plastics), friction (in paper). Paper coating and filling applications require almost exclusively fine fully calcined kaolin pigments such as the 93% brightness ANSILEX-93 ® pigment manufactured by Engelhard Corporation. See, for example, U.S. Pat. No. 3,586,523, Fanselow et al, which describes the production of such pigments from ultrafine Tertiary "hard" ultrafine kaolins. Because of high brightness and light scattering properties of these fine fully calcined kaolin pigments, their primary function in paper applications is to provide opacity and brightness, often as a replacement for much costlier titanium dioxide pigments, which can also be used to enhance these functional properties.

Although these fully calcined kaolin pigments obtained by calcining ultrafine hard kaolins are less abrasive than other calcined kaolin pigments, they are relatively abrasive when compared with available noncalcined kaolin pigments. For example, the conventional so-called "low abrasion" calcined kaolin pigments such as ANSILEX 93 typically have an Einlehner abrasion value of about 20. In practical terms this translates into increased wear of bronze web forming screens (wires) on paper making machines, dulling of paper slitter knives, wear of printing plates when they come in contact with coated paper containing fine calcined pigments in the coating formulation, and, in general, wear of any surface that comes in contact with these pigments. Paper makers are becoming increasingly demanding in their need for lower abrasion.

To overcome the abrasion problem, one can calcine the kaolin pigments at temperatures less than those required to produce pigments generally referred to by those skilled in the art as "fully calcined" pigments. In this instance, calcination temperature is controlled so that the kaolin undergoes a characteristic endothermic dehydration reaction, and the original kaolinite is fully dehydroxylated. The phase that is formed is known as "metakaolin". Calcination temperature is held significantly below that at which the metakaolin collapses as would be indicated by a sharp exotherm in the differential thermal analysis (DTA). In contrast, fully calcined kaolin pigments, such as ANSILEX 93 ® pigment, are calcined at temperatures above this exotherm.

It is well known, however, that the brightness of a metakaolin pigment is always poorer, generally by about 2–3%, than that of fully calcined pigments derived from the same clay calciner feed. Thus, the fully calcined version gives maximum brightness, but with poor abrasion characteristics. On the other hand, the metakaolin version has lower abrasion, but brightness is poorer.

Thus, one approach to reducing abrasion was to provide a metakaolin pigment by mechanically delaminating coarse particles of kaolin, the delamination taking place by agitating a slip of the coarse clay with plastic beads followed by calcination to metakaolin. See U.S. Pat. No. 3,519,452 Morris et al. This approach did not result in ultrabright ultralow abrasion pigments, even when abrasion was measured by the Valley abrasion, an old industry standard now replaced by more demanding Einlehner and needle abrasion testing. Brightness values of 90% were not achieved.

Brightness of calcined kaolin pigments is very strongly influenced by discoloring contaminants. The two most important ones in kaolin pigment technology are iron and titanium oxides. Typically, fully calcined kaolin pigments which are produced from fine hard middle Georgia Tertiary kaolin crudes, such as those mentioned in U.S. Pat. No. 3,586,523, carry iron and titanium contamination of about 0.90–1.1% $Fe_2O_3$ and 1.0–1.8% $TiO_2$, respectively. While the role of colored impurities in the brightness of calcined kaolin pigments is recognized, prior to this invention those skilled in the art were not successful using this knowledge alone to produce calcined kaolin pigments with ultrahigh brightness (e.g., 93% GE brightness or above), in combination with ultralow abrasion (e.g., 10 or lower Einlehner).

Other patents disclosing full calcination of kaolins (including mechanically delaminated kaolins) to provide pigments include: U.S. Pat. No. 3,014,836, Proctor; U.S. Pat. No. 3,058,671, Billue; U.S. Pat. No. 3,343,943, Billue; U.S. Pat. No. 3,171,718, Gunn et al; U.S. Pat. No. 4,381,948, McConnell et al. and French 1,579,130 (1969).

SUMMARY OF THE INVENTION

Novel calcined kaolin pigments of the present invention are in the form of metakaolin and have a G.E. brightness of at least 90%, preferably 93% or higher, an Einlehner abrasion value of 13 or below, and the following particle size distribution on a weight basis (as determined by sedimentation using the SEDIGRAPH® 5100 particle size analyzer).

| PARTICLE SIZE | RANGE | PREPERRED RANGE |
|---|---|---|
| Median, microns | 0.50–0.90 | 0.65–0.80 |
| <2 microns, % | 80–98 | 88–98 |
| <1 microns, % | 60–85 | 64–82 |
| <0.5 microns, % | 5–30 | 10–25 |
| <0.4 microns, % | 0–20 | 2–15 |

The most significant advantage of our fine calcined pigment product over the present state-of-the-art commercial pigments is that our product combines high brightness and extremely low abrasion, with other desirable functional application properties including high light scatter.

In accordance with one aspect of the invention, such pigments are produced by separating a crude kaolin clay into a fraction of coarse well crystallized kaolin particles having a low iron and low titania content and a finer fraction, media milling an aqueous suspension of the coarse fraction sufficiently so that a majority of the particles are finer than 2 microns, drying the milled particles, pulverizing and calcining the milled particles to form metakaolin. Grinding of the severity used in practice of the invention reduces significantly the crystallinity of the kaolin and is readily distinguished by those skilled in the art from delamination.

One advantage of the process of the invention is that it utilizes the coarse reject fraction from the crude clay slip after the desirable coating pigment fractions have been removed. Presently, the coarse fraction is utilized to make delaminated pigments, but our process generates from the same coarse reject fraction significantly more valuable fine calcined pigments. Furthermore, our process can utilize particle fractions with sufficiently low iron and titanium contamination from kaolin deposits which may be unsuitable for manufacture of coating grade pigments due to high viscosity of their aqueous slurries.

THE DRAWINGS

The accompanying figures are photomicrographs illustrating the unique morphology of pigments of the invention which will distinguish them from prior art calcined kaolin pigments including calcined delaminated pigments. In the figures.

DESCRIPTION OF PREFERRED EMBODIMENTS

Figure 1A:
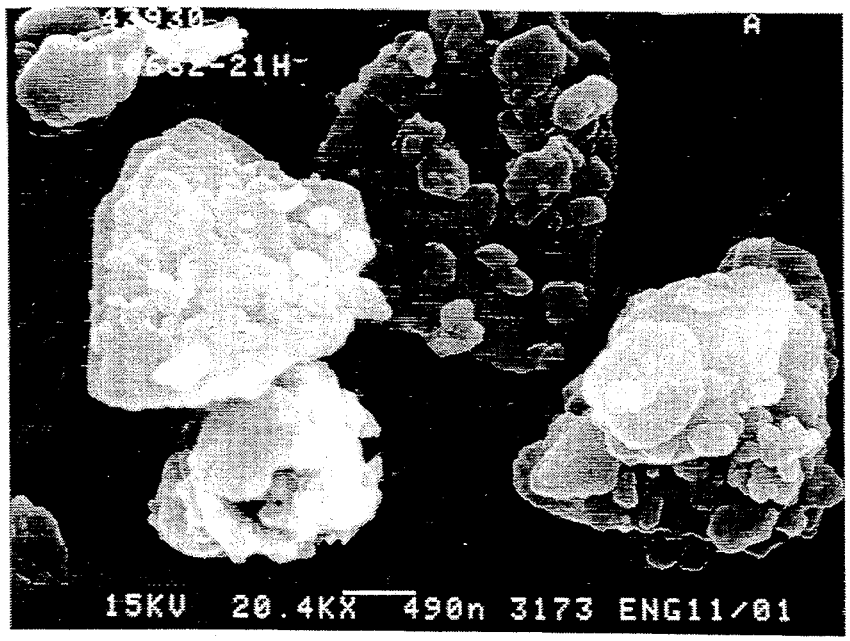
FIG. 1A is a micrograph of the >1 micron fraction of ANSILEX 93 pigment showing classical morphology for the coarse fraction (smaller platelets lying predominantly flat on larger ones).
Figure 1B:
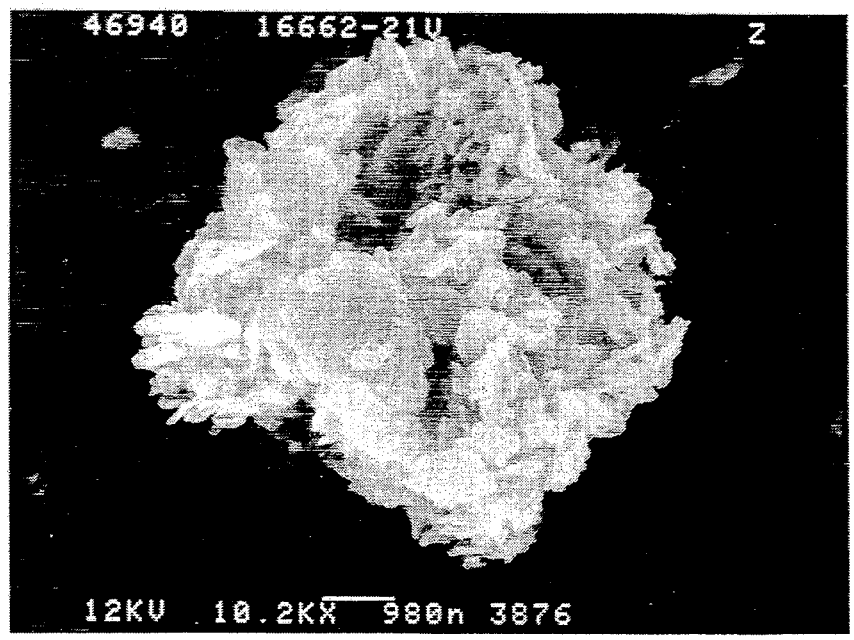
FIG. 1B is a micrograph of the <1 micron fraction of ANSILEX 93 pigment showing typical "porcupine" conformation (abundance of clusters composed of fine randomly oriented particles).
Figure 2B:
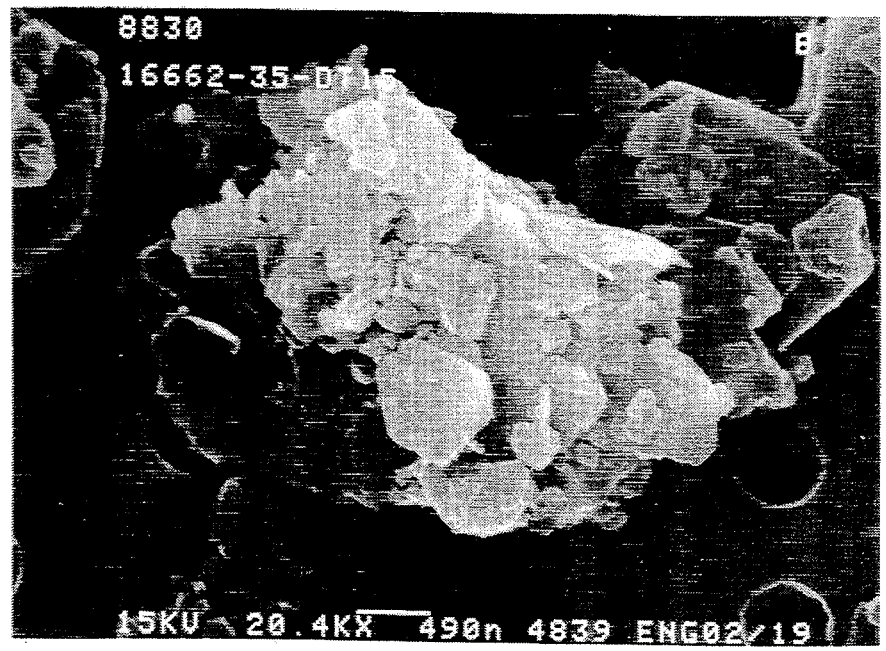
FIG. 2B is a micrograph of the <1 micron fraction of a typical metakaolin pigment of the invention also showing classical morphology with minimal random clusters.
Figure 2A:
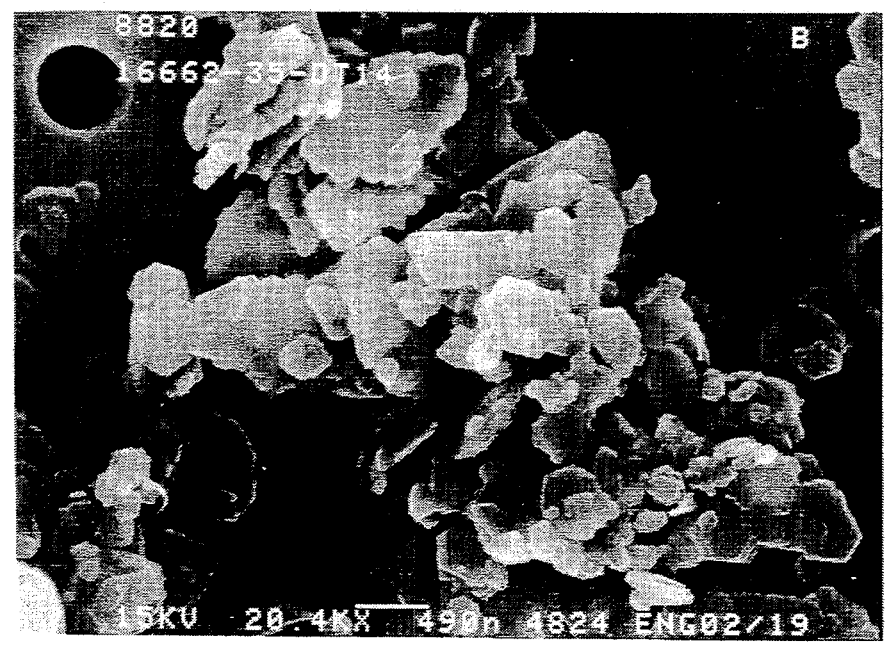
FIG. 2A is a micrograph of the >1 micron fraction of a typical metakaolin pigment of the invention showing classical morphology with minimal random clusters.

This invention uses extensive grinding of coarse kaolin booklets as opposed to delamination to achieve novel metakaolin pigments. The terms "delamination" and "grinding", as used herein, are distinguishable. Soft clay deposits contain naturally separated platy kaolin particles as well as "booklets" which comprise stacks of kaolin platelets. See, for example, the Morris et al. patent, supra and U.S. Pat. No. 3,743,190, Whitley. To accomplish "delamination" of these booklets, comminution of kaolin is carried out under carefully controlled conditions of intensity. The intent of delamination is to provide impact energy which is just sufficient to cleave apart the kaolin platelets comprising the booklets without further fracturing these platelets. The resulting delaminated particles are highly crystalline. In contrast, "grinding", as used in practice of this invention, employs significantly greater impact energies and disregards the preservation of the integrity of kaolin platelets. The intent in grinding as practiced in the present invention is to achieve a desired degree of comminution with the generation of the highest yield of particles in the desired (finer) particle size range. The difference is most readily apparent by comparing the generation of particles finer than 2 microns (as determined by conventional sedimentation techniques). In delamination, the increase in the content of particles finer than 2 microns is generally minimal, typically 20% by weight. In grinding, at least grinding of the type contemplated in practice of this invention, the increase in minus 2 microns is significant and is typically 30–60% by weight. Some media grinding operations, for example, the glass microballoon media grinding described in U.S. Pat. No. 3,743,190 (supra) actually effects delamination although the term "grinding" is used. This is clear from the text of the patent.

It is well known to kaolin pigment technologists that the amount of iron and titanium oxides in soft middle Georgia clays decreases significantly as the particle size of the clay increases. In other words, these impurities concentrate in the fine particle size fractions of such clays during fractionation. This knowledge is utilized in practice of the invention. Our process utilizes the soft clay coarse particle rejects after centrifugal separation of coating pigment fractions: e.g., 80% by wt. <2.0 micrometers and 90% <2.0 micrometers. Such coarse reject particles are commonly used in the present clay processing schemes as a feed to delaminators to produce mechanically delaminated pigment grades. Preferably, when this coarse clay is employed as grinder feed in our process it has been beneficiated by high intensity magnetic separation, flotation and chemical bleaching (or combination of such steps) to further remove the undesirable titanium and iron contaminants. Such beneficiation can take place before or after grinding.

The coarse clay is media milled to grind the kaolin particles to a point where a significant proportion thereof constitutes a suitable size for the production of fine calcined pigments, e.g., fine calcined pigments which are about 100% finer than 2 microns and 86% finer than 1 micron. Typically, the kaolin charge is ground to at least approximately 50% by weight finer than 2 microns and preferably to at least 75% by weight finer than 2 microns and then separated by gravity or centrifugal sedimentation into a fraction which is typically approximately 85% to approximately 95% by weight finer than 1 micron. The fine ground fraction is recovered, washed, dispersed, spray dried, pulverized, calcined and pulverized again. If necessary, high intensity magnetic separation, flotation or other beneficiation techniques can be applied to the clay advantageously after grinding, when some internally lodged impurities are exposed by the grinding.

The kaolin clay used as feed to a grinding mill in practice of the invention should be high purity relatively coarse size fraction of a degritted soft kaolin crude. The kaolin should contain at most about 65% by weight and preferably at most 20% by weight, of particles finer than 2 microns, as determined by sedimentation using a SEDIGRAPH ® 5100 particle size analyzer. Iron content should be low, e.g., no more than 0.60% by weight, preferably no more than 0.25% weight, reported as $Fe_2O_3$. (The weight is based on the dry clay weight.) $TiO_2$ content should be below 1.60% by weight, preferably below 0.80% by weight, based on the dry clay weight. The clay should not contain other mineral impurities, such as smectites, mica or quartz, alkali metal compounds and contaminants which may form colored compounds or impare abrasion upon calcination.

One convenient source of clay feed for the practice of our invention is obtainable from coarse soft white crudes having a high purity coarse fraction after removal of fines. A coarse hydrous kaolin obtained by such fractionation is commercially available under the trademark NUSURF and is useful as feed to the media mill. Typically NUSURF kaolin has the following particle size distribution: 2.5 micron median, 45% finer than 2 microns, 32% finer than 1 micron and 20% finer than 0.5 micron.

Another convenient source of clay feed for the practice of our invention is also obtainable from coarse soft white crudes having a high purity coarse fraction, which remains after the separation of finer pigmentary fractions such as the fraction with 80% of particles finer than 2 microns or the fraction with 90% of particles finer than 2 microns. Usually, this coarse particle fraction serves as the feed to mechanical delaminators to generate the delaminated particles for the delaminated pigment grades. Typical particle size distribution of this coarse particle fraction (as determined by sedimentation) is: 5.5 micron median, 78% finer than 10 microns, 47% finer than 5 microns and 17% finer than 2 microns.

Other suitable kaolin feed is obtained by purifying an unfractionated soft kaolin crude by froth flotation to remove colored impurities, e.g., by the procedure described in U.S. Pat. No. 4,492,628, Young et al. This procedure is referred to in the clay industry as TREP. In adapting TREP to the present invention, the flotation beneficiated clay is fractionated into one or more coating clay fractions, e.g., fractions 80-90% by weight finer than 2 microns. The coarse fraction remaining after recovery of the coating fractions is used as feed to the grinding equipment. Typically such material has an $Fe_2O_3$ analysis of 0.40%, $TiO_2$ content of 0.25%, and the following particle size distribution: 33% <2 micron and 4.0 micron median as measured with a SEDIGRAPH ® 5100 particle size analyzer.

Flotation processes such as ULTRAFLOTATION, e.g., U.S. Pat. No. 2,990,958, which operate with pre-fractionated feed (as opposed to whole, unfractionated feed useful in TREP) can also be used. In such cases, the flotation beneficiated clay should be relatively coarse, e.g., 80% by weight coarser than 2 microns prior to charge to grinding mills.

High intensity magnetic separators (HIMS units) can be used with floated as well as unfloated feed clay to remove paramagnetic colored impurities.

The ultrafine hard kaolin used to manufacture ANSILEX 93 and similar calcined kaolin pigments supplied by other kaolin producers is not suitable in practice of the invention. The fine particle fraction (about 90% by weight finer than 1 micron) derived from this ultrafine kaolin will not result in a pigment of desired brightness upon calcination to metakaolin using presently available kaolin beneficiation technology. Brightness of about 90.5% is typically obtained. However, such metakaolin pigment may have the desired low Einlehner abrasion. Similarly, grinding of fully calcined high brightness pigments (i.e., post grinding of previously calcined kaolin pigments) will not yield a fine calcined kaolin pigment displaying a unique combination of high brightness and low abrasion with excellent performance in paper filing and coating.

Grinding is carried out with particulate hard grinding media, and is preferably conducted in the presence of water. This type of operation is conventionally referred to as "wet grinding". The clay feed is preferably placed in the form of a dispersed aqueous slip that is sufficiently fluid to be pumped and transported through the grinding equipment.

Usually a clay dispersant is employed to increase the solids of the slip of clay. Preferred dispersant is ammonium polyacrylate, but sodium polyacrylate or other organic dispersants employed in kaolin pigment processing can also be used. The amount of dispersant used is typically 0.20 to 0.40% based on the weight of clay. An excess of dispersant beyond that needed for good dispersion is added at the beginning of the milling period (or in the grinder feed, if continuous operation is used) to allow for the newly developed surface area during the grinding operation. No heating of the mill charge is observed during a slow milling process in a jar mill. However, in a laboratory impeller driven mill the energy is introduced at a much faster rate, and the mill charge heats up, necessitating occasional addition of water to the open batch mill to maintain a constant volume in the mill. Similarly, the clay slip heats up during its passage through a commercial impeller driven media mill.

Recommended is the use of clay slips containing from 20% to 70% clay solids. The grinding media should be a dense hard material which does not discolor the clay charge or leave objectionable residues in the ground clay. Density of the grinding media is preferably at least 2.4. A preferred media is alumina beads (such as 20-40 mesh, U.S. Stoneware Co.). Plastic beads of the type used commercially to delaminate clays are not suitable because they do not achieve grinding necessary in the practice of the present invention. Grinding should take place in equipment which is not degraded by the grinding media since this may result in staining of the ground clay charge.

The displacement volume of grinding media relative to clay slip in laboratory grinding is typically from 1:1.25 to 1:3.00. In the commercial unit, this ratio is typically from 1:0.8 to 1:1.0.

Grinding time will depend on the specific mechanical details of the grinding unit (bead size, specific gravity, charge, clay solids, intensity of agitation, etc.) and the coarseness of the clay feed. Typically grinding time is 20–480 minutes in the laboratory impeller driver unit. In the commercial unit, the average retention time is about 1.5–2.5 minutes.

Energy input during grinding is about 160 horsepower hours per ton of clay.

Sufficient time is employed to grind the kaolin into particles which are at least 75% by weight finer than 2 microns in an impeller driven laboratory mill (vide infra). Since the clay feed to the grinder typically contains at most 30% by weight of particles finer than 2 microns, it is obvious that a drastic reduction in particle size is achieved.

Grinding may be batch or continuous. For one mode of laboratory batch operation, a one-gallon jar mill of all porcelain construction was used in the accompanying illustrative examples. The inside dimensions of the mill were: diameter 19 cm. and height 17 cm. The mill was charged with 4256 g. of alumina beads (20–40 mesh) and 2200 ml. of clay dispersion in water, and was rolled with its axis in a horizontal position at 47 RPM for 60 hours. The clay slurry was separated from the milling media by pouring it through a screen.

Laboratory impeller milling employed in illustrative examples used a mill comprising a vertical, approximately cylindrical vessel with an open top and a shaft with three circular impeller discs mounted on it and concentric therewith. The discs had a diameter of $3\frac{1}{2}$ inch and were $\frac{3}{8}$ inch thick. The first disc was mounted on the bottom of the shaft, the next disc was mounted $1\frac{3}{8}$ inch above the bottom one, and the third disc the same distance above the second one. The material of construction is either colorless Nylon or colorless Plexiglass. The steel shaft is also protected with a Nylon or Plexiglass sleeve. The shaft with impellers was positioned in the center of the vessel approximately 2 cm. above the bottom of the vessel and was driven at 2000 RPM with a 1 HP electric motor. The vessel was a NALGENE ®plastic 4-liter beaker with the following dimensions: bottom diameter 15.0 cm., top diameter 18.5 cm., depth 24.5 cm. The mill charge consisted of 5000 g. of alumina beads (20–40 mesh) and 2200 ml. of clay slurry. Milling time using this equipment is usually 2 hrs. After milling, the clay slurry was separated from the milling media by pouring it through a screen.

In laboratory operation the milled slurry was classified by gravity sedimentation to the desired particle size, and the coarse portion was discarded.

A horizontal 250-liter Perl ® media mill (Drais, Allendale, N.J.) was used in a commercial scale operation. It was charged with 24 mesh alumina beads to 85% of bulk volume. The mill was fed continuously with a clay slurry containing 20–33% clay solids at a rate of about 11 gallons per minute. The mill discharge was classified centrifugally to separate the fine product fraction containing about 93% of particles finer than 1 micron as determined by sedimentation. The coarse reject fraction was returned to the media mill feed stream. In this closed loop mode of operation essentially 100% of the clay would be converted into product.

In both batch and continuous operations, the mill discharge is classified centrifugally or by gravity to separate the desired fine fraction, which typically is nearly 100% by weight finer than 2 microns and contains 85–95% of particles finer than 1 micron. Although in illustrative examples the coarse particles were discarded, in commercial practice a closed loop operation is employed, wherein such coarse particles are returned to the grinding unit.

The slip of fine particle size ground clay is optionally further purified by magnetic separation and brightened by a bleach such as sodium hydrosulfite (dithionite). The clay is then filtered and washed. The filer cake is dispersed preferably with ammonium polyacrylate before spray drying. Prior to conversion to metakaolin the ground clay must be pulverized. This can be done by passing the dried clay six times through a Micromill Model CF pulverizer equipped with a screen with 0.020" round holes. In commercial operation the spray dried clay is intensely pulverized in a Raymond Hurricane ® pulverizer.

The kaolin exotherm must be avoided when preparing the preferred metakaolin pigments of the present invention because calcination beyond the metakaolin state results in pigments having higher than the desired abrasion values.

Commercial vertical and horizontal rotary calciners can be used to produce conventional low abrasion calcined kaolin pigments, but operation is controlled to avoid calcining beyond the metakaolin state. In laboratory tests described in the examples, samples were calcined in refractory trays in a muffle furnace at temperatures of 675°–950° C. for 40–60 min.

After calcination, the material is pulverized. In the laboratory-scale examples, this was done in a single pass through a Micromill Model CF pulverizer equipped with a 0.039" round hole screen. In commercial operation, this is also accomplished in a Hurricane ® mill.

The following examples are given for illustrative purposes.

EXAMPLE 1

This example illustrates the preparation of a pigment of the invention from the coarse rejects of a TREP flotation plant. A one-gallon porcelain jar mill was charged with 4256 g. of 20–40 mesh alumina grinding beads (alpha alumina supplied as 20–40 mesh beads by U.S. Stoneware Co.) and with 2200 ml. of 44.1% solids "TREP'ed" feed clay slurry. The particle size distribution of this feed clay is given in Table I as sample A1. The jar mill was rolled for 60 hrs. to grind the clay. The clay slurry was separated from the milling media by pouring it through a screen, and the fine particle size fraction was separated by gravity sedimentation. Particle size distribution of milled clay and of the fine fraction are shown in Table I as samples A2 and A3, respectively. The fine fraction was acidified with sulfuric acid to pH 3.0 and bleached with 8 lbs. sodium dithionite per ton of clay. The bleached clay was filtered, washed, dispersed with sodium polyacrylate, spray dried, intensely pulverized in a Micromill Model CF pulverizer, (0.020 inch round hold screen, six passes, vide supra), calcined in an open refractory tray in a muffle furnace at 875° C. for one hour and pulverized again (one pass through the same mill, 0.039 inch round hold screen) to yield a metakaolin pigment. The particle size distribution of the metakaolin product is given in Table I as sample A4; iron oxide and titanium oxide impurity analyses appear in Table II; brightness and Einlehner abrasion values are reported in Table III; black glass scattering in Table IV. For comparison, abrasion and light scattering results are also shown for commercial ANSILEX 93 ® pigment.

EXAMPLE 2

A duplicate sample was prepared in an identical manner to that described in Example 1, except that ammonium polyacrylate was used as a dispersant for spray drying the bleached and washed clay. Properties are shown in the same data Tables under parallel sample codes B3 and B4.

EXAMPLE 3

This example shows that calcination of an ultrafine natural kaolin (not mechanically ground to achieve ultrafine size) will not produce a high brightness low abrasion pigment when calcined to metakaolin.

A sample of kiln feed was obtained from a commercial kaolin plant in Georgia as bleached filter cake. The feed was a fine size fraction of hard kaolin of the type used to produce high brightness fully calcined kaolin (93% G.E. brightness). The particle size distribution of the kiln feed is shown in Table I as sample D3. From this point, the clay was processed to a metakaolin pigment as in Example 2. Its properties are shown in Tables I through II under sample code D4.

A sample of ANSILEX 93 ® pigment was also evaluated and compared with metakaolin pigments prepared in Examples 1 & 2.

Results show the following:

The metakaolin pigment prepared from the flotation beneficiated media ground coarse kaolin was better in brightness and Einlehner abrasion than ANSILEX 93 ® pigment.

The metakaolin pigment prepared from the flotation beneficiated media ground coarse kaolin had light scattering equivalent to ANSILEX 93 ® pigment at 457 nm wavelength and was better at 577 nm wavelength.

The metakaolin pigment prepared from the flotation beneficiated media ground coarse kaolin had much higher brightness than a parallel sample prepared from a plant calciner feed using naturally-occurring (unground) fine kaolin.

TABLE I
PARTICLE SIZE DISTRIBUTION DATA OF METAKAOLIN PIGMENTS

| SAMPLE | Cumulative % | | | Median, micr. |
|---|---|---|---|---|
| | <2.0 micr. | <1.0 micr. | <0.4 micr. | |
| A1, Coarse Fraction of TREP floated kaolin | 35.0 | 24.3 | 10.5 | 3.43 |
| A2, Milled | 86.6 | 70.9 | 35.6 | 0.55 |
| A3, Classified | 98.6 | 94.7 | 49.7 | 0.40 |
| A4, Calcined | 94.7 | 71.0 | 2.7 | 0.78 |
| B3, Milled, Classified | 98.4 | 95.6 | 55.0 | 0.37 |
| B4, Calcined | 91.4 | 71.1 | 5.7 | 0.75 |
| D3, Plant Calciner Feed | 94.3 | 89.2 | 64.5 | 0.31 |
| D4, Calcined | 94.7 | 83.4 | 17.7 | 0.57 |

TABLE II
IMPURITY ANALYSIS

| CALCINED PRODUCT | Fe$_2$O$_3$, % | TiO$_2$, % |
|---|---|---|
| A4, TREP'ed Feed | 0.37 | 0.40 |
| D4, Plant Calc. Feed | 0.95 | 1.27 |

TABLE III
BRIGHTNESS AND ABRASION DATA

| CLAY SOURCE | UNCALCINED BRIGHTNESS GE, % | CALCINED PRODUCT | |
|---|---|---|---|
| | | BRIGHTNESS GE, % | ABRASION (EINLEHNER |
| TREP'ed Clay, | | | |
| A4 | | 93.4 | 13 |
| B4 | | 93.7 | 7 |
| Plant Calciner Feed, D4, | 90.0 | 90.4 | 10 |
| ANSILEX 93 ® Pigment | | 93.0 | 20 |

TABLE IV
BLACK GLASS LIGHT SCATTERING

| PIGMENT | SCATTERING, m$^2$/g | |
|---|---|---|
| | 457 nm. | 577 nm. |
| ANSILEX 93 ® Pigment | 0.294 | 0.211 |
| Metakaolin Pigment from Milled & TREP floated coarse kaolin (A4) | 0.291 | 0.229 |

EXAMPLE 4

Effect of Media Milling on DTA and Crystallinity of Coarse Kaolin

The Hinckley crystallinity index and DTA (Differential Thermal Analysis) testing used in this example can be employed to characterize changes arising from grinding and to distinguish grinding from delamination.

The effects of laboratory media milling on the crystallinity index and on the calcination exotherm were evaluated. See Example 1 for details of the media milling of the coarse fraction of TREP beneficiated kaolin. The sample labeled "NUSURF" was a commercial product filter cake taken from the plant before final spray drying operation. The NUSURF product is processed from coarse soft clays by first removing the coating fractions (No. 1 and No. 2), delaminating the coarse fraction and again removing the delaminated particles comprising 80% of <2 micron fraction. The remaining coarse residue is processed to NUSURF kaolins by magnetic beneficiation followed by dithionite bleaching. Evaluations were made on the samples of the media milled coarse kaolin and the fine fraction thereof (90% <1 micron). Results are given in table form (Table V).

These data show that crystallinity index decreases after intensive grinding of the sample in a media mill. Crystallinity index of the fine particle fraction separated after grinding was lower yet than that of the whole milled sample.

Similarly, the peak of the calcination exotherm moves to a lower temperature with grinding and fine particle size separation in the same manner as the Hinckley index. The onset of the DTA exotherm also moves to a lower temperature for two of the three samples. Furthermore, the DTA curves generated during the testing show that in two out of three cases the amount of energy released was lower for the milled samples than that for the original unmilled sample. These results indicate that the intensive media milling used in practice of the invention cause significant alterations of the crystal structure of kaolinite.

TABLE V
EFFECT OF GRINDING ON CRYSTALLINITY AND DTA EXOTHERM

| SAMPLE | HINCKLEY CRYST. | DTA EXOTHERM ONSET °C. | PEAK °C. | AREA MCAL/MG |
|---|---|---|---|---|
| COARSE TREP, AS REC'D | 0.80 | 982.81 | 992.33 | −54.40 |
| +AFTER MILLING | 0.67 | 982.71 | 991.62 | −50.81 |
| FINE FRACTION | 0.60* | 982.81 | 990.94 | −46.81 |
| FULL FRAC. TREP, AS REC'D | 0.82 | 983.42 | 992.75 | −45.77 |
| **FINE FRACTION | 0.61 | 974.75 | 985.11 | −46.15 |
| NUSURF, AS REC'D | 0.58 | 981.62 | 992.75 | −48.28 |
| **MILLED 30 MIN | 0.44 | 981.59 | 992.28 | −50.76 |
| MILLED 60 MIN | 0.44 | 981.72 | 992.12 | −44.52 |
| MILLED 2. HRS | 0.40 | 981.75 | 991.69 | −47.46 |
| MILLED 3. HRS | 0.39 | 981.12 | 991.81 | −45.44 |
| FINE FRACTION | 0.42 | 970.65 | 982.70 | −42.57 |

*AVERAGE OF THREE DETERMINATIONS
**IMPELLER DRIVEN MEDIA MILL
+JAR MILL

EXAMPLE 5

A characteristic of the metakaolin pigments of the invention is the narrow particle size distribution, reflected by steepness of the particle size distribution curve.

Metakaolin pigments were obtained by media milling the coarse size fraction of TREP floated soft clay, as described in Example 1. Other metakaolin pigments were obtained by media milling NUSURF kaolin and clay samples labeled #8. The latter constitute a clay feed to commercial delaminators, which generate delaminated pigment (as the fine portion). Particle size distribution curves were obtained by the SEDIGRAPH ® 5100 analyzer. The ratio of size (microns) at 10% by weight to size at 90% by weight were calculated from the curves to establish a measure of narrowness of size distribution. Similar ratios were calculated for 20% and 80% by weight values. The results, summarized in Table V, show that experimental metakaolin pigments had a steeper particle size distribution curve than ANSILEX 93 ® calcined kaolin except for samples obtained from NUSURF kaolin.

TABLE VI
PARTICLE SIZE DISTRIBUTION OF CALCINED KAOLIN PIGMENT

| | MEDIAN MICR. | CUMULATIVE % | | | | RATIOS (MICR/MICR) | |
|---|---|---|---|---|---|---|---|
| | | <2 | <1 | <0.5 | <0.4 | 10%:90% | 20%:80% |
| ANSILEX 93 | 0.79 | 88.7 | 66.4 | 14.4 | 5.9 | 0.20 | 0.39 |
| METAKAOLIN PIGMENTS | | | | | | | |
| Coarse Trep | 0.78 | 94.7 | 71.0 | 10.1 | 2.7 | 0.31 | 0.45 |
| Coarse Trep | 0.71 | 97.4 | 79.2 | 18.1 | 7.8 | 0.32 | 0.51 |
| Coarse Trep | 0.76 | 93.9 | 72.8 | 13.4 | 4.8 | 0.29 | 0.46 |
| NUSURF | 0.69 | 91.9 | 75.4 | 22.4 | 10.0 | 0.22 | 0.44 |
| NUSURF | 0.72 | 90.3 | 69.8 | 25.3 | 13.5 | 0.19 | 0.32 |
| NUSURF | 0.80 | 88.3 | 64.0 | 17.3 | 7.7 | 0.20 | 0.34 |
| #8 OLD | 0.70 | 95.0 | 78.8 | 17.3 | 6.1 | 0.29 | 0.51 |
| #8 NEW | 0.66 | 97.1 | 81.2 | 25.0 | 11.2 | 0.28 | 0.47 |

The following test procedures were employed to obtain values reported herein:
G.E. brightness—TAPPI T646 om-86
Black Glass Scatter—U.S. Pat. No. 4,738,726 p.11, lines 34–52
Particle size—Sedimentation using Sedigraph ® 5100 particle size analyzer—Values reported as microns (equivalent spherical diameter)

In the Einlehner Abrasion test, the weight loss of a wire disc contacted by a rotary abrader and test material is used a relative measure of the abrasiveness of the test material. Details of the procedures and equipment used to obtain values reported in this application are as follows:

MATERIALS AND APPARATUS

1. Einlehner AT1000
2. Phosphor Bronze P.M. Wire Discs
3. Ultrasonic Bath
4. Vacuum desiccator
5. Tallboy Mixer
6. Usual laboratory equipment such as: balance (analytical and top loading), glassware, pH meter, oven
7. Reagents
   a. 5% by weight Sodium Pyrophosphate Solution (TSPP)
   b. Deionized Water
   c. Isopropyl Alcohol
   d. 1:1 NaOH

SAMPLE PREPARATION

1. Weigh 150 grams of sample to be tested. Measure 850 ml of deionized water and pour 75% into a 1 liter stainless steel beaker and add the weighed out 150 grams of sample. Save the remaining amount of deionized water to flush the slurry when it is later poured into the test cylinder.
2. Adjust pH of slurry to 7.0 using 5% TSPP solution or 1:1 solution of HCL.

3. Mix slurry 10 minutes on Tallboy mixer.

SAMPLE EVALUATION

1. Prepare test screens by placing several screens into a 250 beaker of micro detergent and deionized water. Place beaker into a ultrasonic bath for 5 minutes.
2. After treatment remove screen and wash thoroughly with deionized water. Dry screen with Isopropyl alcohol. Then dry in oven at 105° C. for 15 minutes. Place screen into desiccator until needed.
3. Weigh treated test screen and place, with the marked side (blue side) facing the floor plate of the test cylinder, and assemble unit.
4. Place the rotary abrader on the tip of the rotating shaft. Make sure abrader is in the proper starting position (position 1–5).
5. Pour slurry into test cylinder and use the deionized water that was previously saved to flush any slurry that may remain in the stainless steel beaker.
6. Choose the appropriate instrument setting (Table I). Lower agitator shaft and put toggle switch to the on position to begin test.
7. Test is completed when the prescribed rotations are completed. The instrument will automatically shut off.
8. Raise the agitator shaft, remove the cylinder and remove test screen.
9. Wash test screen with deionized water and place in micro solution. Place in sonic bath for 5 minutes. Rinse with Isopropyl alcohol.
10. Dry screen in oven at 105° C. for 15 minutes. Place screen into desiccator to cool.
11. Weigh screen to nearest 0.1 mg.
12. Report results according to calculation.

Calculation:

$$\frac{100,000}{\text{No. of revolutions}} \times \text{mg. wt. loss} = \text{abrasion} \left(\frac{\text{mg}}{1000,000 \text{ rev.}}\right)$$

| SETTINGS AND NUMBER OF ROTATIONS | | | | | |
|---|---|---|---|---|---|
| Settings | | 1 | 2 | 3 | 4 | 5 |
| Number of Rotations | × 10³ | 7.25 | 21.75 | 43.5 | 87 | 174 |

Note:
A cycle time should be chosen to give a weight loss of at least 10 mg. but not over 40 mg.
- Hydrous Kaolins are run using setting 5
- Calcined Kaolins are run using setting 3

We claim:

1. A method for producing a low abrasion high brightness calcined kaolin pigment which comprises separating a crude soft kaolin clay into a fraction of coarse, well crystallized kaolin particles and a finer fraction, media milling an aqueous suspension of the coarse crystalline kaolin particles with particles of media having a density of at least 2.4 to grind a majority of said coarse crystalline kaolin particles into particles finer than 2 microns, drying, pulverizing and calcining the milled particles to form metakaolin, said grinding step reducing the crystallization index of said crystalline kaolin.

2. The method of claim 1 wherein said coarse fraction of the crude clay is obtained after removing coating pigment fractions from said crude clay.

3. The method of claim 1 wherein said media is alpha alumina.

4. The method of claim 1 wherein a fraction of the ground kaolin is fractionated and a fraction that is substantially all finer than 2 microns is recovered and then dried, pulverized and calcined.

* * * * *